C. A. KEARNS & P. J. HARTIGAN.
PUMP FOR MOTOR VEHICLES.
APPLICATION FILED SEPT. 6, 1916.

1,226,530. Patented May 15, 1917.
2 SHEETS—SHEET 1.

Witness
Wm. Mav. Duvall.

Inventors
C. A. Kearns and
P. J. Hartigan,
By Victor J. Evans
Attorney

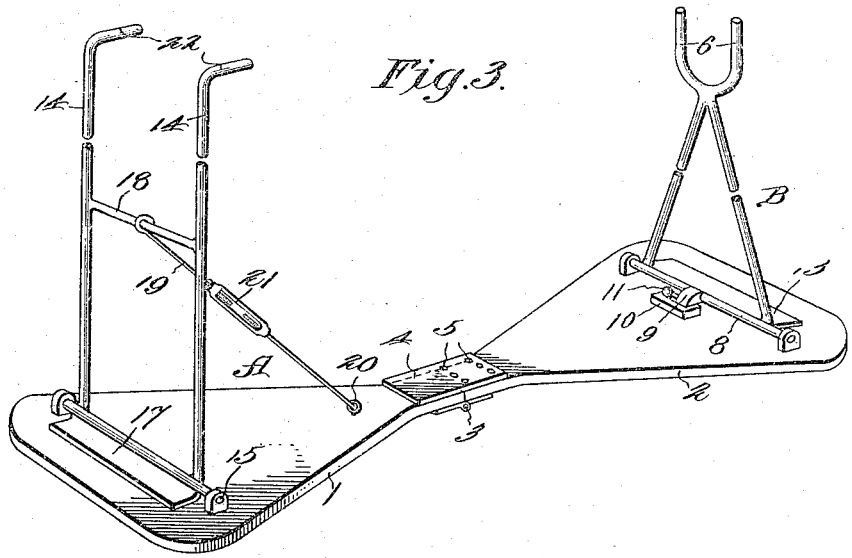
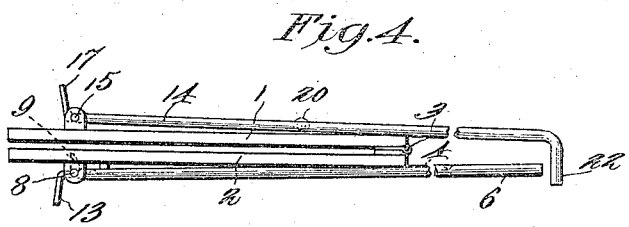
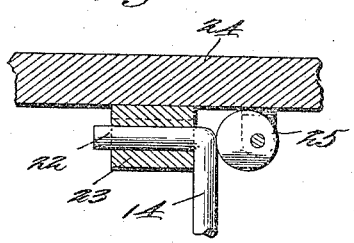

UNITED STATES PATENT OFFICE.

CHESTER A. KEARNS AND PATRICK J. HARTIGAN, OF PAYNESVILLE, MINNESOTA.

PUMP FOR MOTOR-VEHICLES.

1,226,530.  Specification of Letters Patent.  Patented May 15, 1917.

Application filed September 6, 1916. Serial No. 118,692.

*To all whom it may concern:*

Be it known that we, CHESTER A. KEARNS and PATRICK J. HARTIGAN, citizens of the United States, residing at Paynesville, in the county of Stearns and State of Minnesota, have invented new and useful Improvements in Pumps for Motor-Vehicles, of which the following is a specification.

This invention relates to pumps for motor vehicles, the objects in view being to produce a pump especially designed for supplying water under pressure for the purpose of washing motor vehicles, the said pump being arranged to be driven by one of the driving wheels of an automobile or similar vehicle, said pump being supported in proper relation to said driving wheel by means of a stand, the latter also embodying means whereby the driving axle of the vehicle is supported in a sufficiently elevated position to enable the pump-actuating driving wheel of the vehicle to turn freely while in or out of contact with a supporting surface.

A further object of the invention is to provide a pump and vehicle-supporting stand, the construction of which enables it to be folded compactly so that it may be carried in the vehicle, further compactness of the complete structure being obtained by making the pump-supporting bed detachable from the stand.

With the above and other objects in view the invention consists in the novel construction, combination and arrangement of parts herein fully described, illustrated and claimed.

In the accompanying drawings:—

Figure 1:
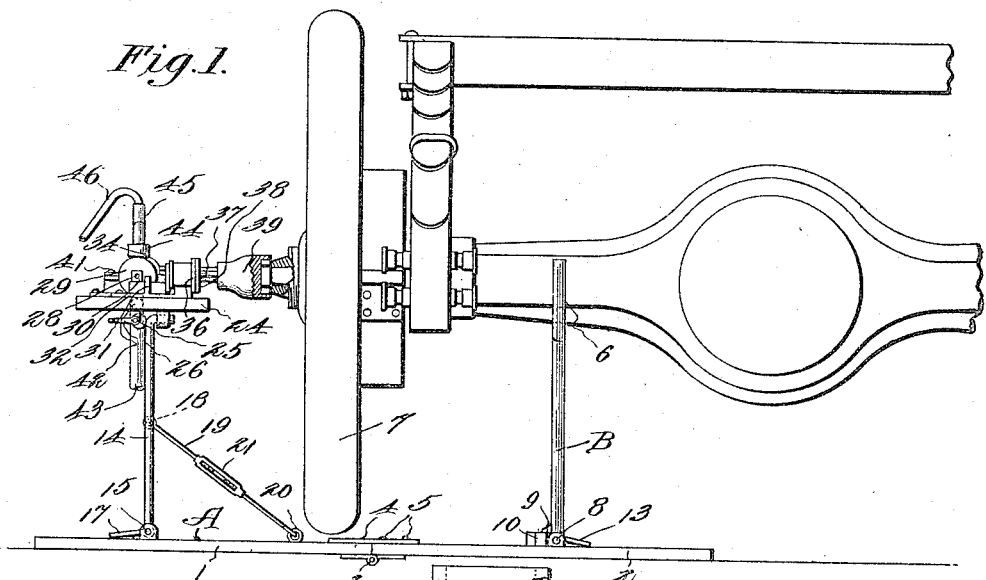
Figure 2:
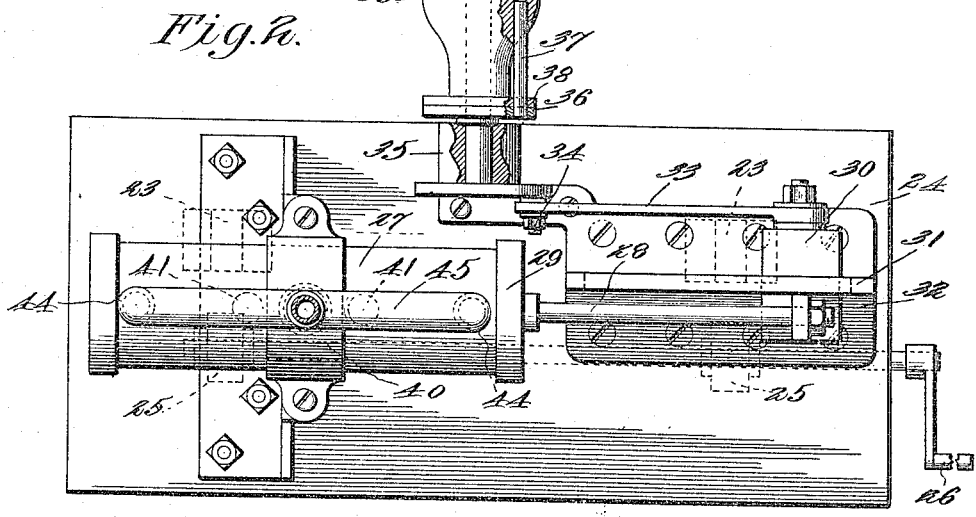

Figure 1 is a rear elevation, partly in section, showing the pump of this invention in its applied relation to a motor vehicle, Fig. 2 is a plan view of the pump and stand detached from the vehicle, Fig. 3 is a perspective view of the stand, omitting the pump, Fig. 4 is an edge view of the stand folded, Fig. 5 is an enlarged fragmentary section showing the cam locking means between the pump bed and the stand.

Referring to the drawings A designates generally the base of the stand which comprises the sections 1 and 2 the same being connected together by a hinge pin 3. One of the sections 2 is provided with a projecting stop 4 at its inner end adapted to overlie the corresponding end of the other section 1 for the purpose of preventing the hinge joint from breaking downwardly, while permitting said joint to break upwardly thereby enabling the base A to be folded from the normal working position shown in Fig. 3 to the position shown in Fig. 4. The stop 4 is shown in the form of a plate secured by rivets or other fasteners 5 to one of the sections of the base.

Extending upwardly from the base section 2 is a vehicle-supporting and lifting member designated generally at B and constituting a jack, the same having a U-shaped axle-receiving fork or rest 6. This adapts the driving axle housing to be raised and lowered in the manner plainly indicated in Fig. 1 so that the adjacent driving wheel 7 of the vehicle may be lifted clear of the ground. The supporting and lifting member B is connected by a hinge pin 8 to the base section 2 in order that it may be folded through an arc of approximately ninety degrees, from the position shown in Fig. 4, and vice versa. To support the member B in perpendicular relation to the base, said support is shown as provided with a projection or lug 9 adapted to be engaged by a chock 10 slidable on and carried by the section 2 and having a longitudinal slot therein which receives a retaining and guiding pin 11 on the section 2 enabling the chock 10 to be moved into and out of the path of the lug or projection 9 for the purpose of preventing the member B from swinging inwardly, and sustaining the member B in a substantially vertical position, or allowing said member B to be folded into substantially parallel relation with that section of the base A to which it is connected. The member B is also provided with a stop flange 13 which also assists in maintaining said member in a vertical position in conjunction with the chock 10.

Extending upwardly from the other base member 1 is a pair of supporting legs or uprights 14 the same being connected at their lower extremities to a rock shaft 15 which is journaled in bearings 16 on the base. The rock shaft 15 is formed with a stop flange 17 serving to limit the upward movement of the legs or supporting uprights 14. The uprights 14 are connected by a cross piece 18 and the latter has attached thereto one end of a longitudinally-extensible brace 19 the other end of which has a joint connection at 20 with the base. The brace 19 comprises a turn buckle 21 in order to enable the same to be lengthened and shortened to hold the uprights 14 substantially perpendicular with the base and to permit said uprights to be folded into substantially parallel relation to the member 1 of the base. By means of the construction just described, the stand and the several parts thereof, may be folded from the position illustrated in Fig. 3 to the position illustrated in Fig. 4, thereby adapting the stand structure to be compactly carried in a motor vehicle.

The upper extremities of the uprights 14 are bent substantially at a right angle to form extensions 22 which are insertible in keepers 23 on the underside of the supporting bed 24 of the pump. Pivotally mounted on the bed 24 are cams 25 having operating handles 26, the cams 25 coöperating with the upper ends of the uprights 14 to hold the extensions 22 in the keepers 23 and also permits said parts to be disconnected in order that the pump mechanism and the bed 24 thereof may be detached from the supporting stand.

The pump is of the double action type and comprises a cylinder 27 in which operates a piston actuated by a piston rod 28 passing through a stuffing box 29 at one end of the cylinder. The piston rod 28 connects to a sliding cross head 30 which reciprocates in a cross head guide 31 having a base flange 32 by which it is secured to the pump bed 24. Pivotally connected to the cross head 30 is a pitman or connecting rod 33 which extends to a balanced crank shaft 34 journaled in a bearing 35 preferably formed as an integral part of the cross head guide 31. The crank shaft 34 has a disk-shaped head 36 from which projects a pin or key 37 which is insertible through a hole in a disk-shaped flange 38 on the adjacent end of a socket head 39, said head being formed with a hexagon socket to fit the correspondingly-shaped nut on the adjacent driving wheel 7 of the motor vehicle. The pin 37 causes the socket head 39 to drive the pump. The pump is held in proper relation to the socket head 39 and the latter is held in proper relation to the driving wheel of the vehicle by means of the longitudinally-extensible and adjustable brace 19 which regulates the position of the uprights 14 that support the bed plate 24 of the pump. 40 designates the pump cylinder supporting-bracket or clamp which is fastened to the bed plate 24.

The pump cylinder is provided with two inlet valves 41 arranged to admit water from an inlet manifold 42 to which is connected a suction pipe 43 of any suitable length to adapt the same to be inserted in a body of water. The pump cylinder is likewise provided with two outlet valves 44 which deliver the water under pressure to an outlet manifold 45 from which a hose 46 leads off. Both strokes of the piston of the pump are thus used in the pumping operation thereby causing a practically continuous flow of water through the service pipe or hose 46.

From the foregoing description taken in connection with the accompanying drawings, it will now be understood that the stand which in itself is capable of being compactly folded, acts as a support for the bed of the pump to hold said pump in operative relation to one of the driving wheels of a motor vehicle and also as a means for jacking up the adjacent end of the driving axle housing of the vehicle in order that said driving wheel may revolve clear of the base of the stand when the pump as a whole is in its proper coöperative relation to the vehicle as illustrated in Fig. 1. As a whole the mechanism is particularly valuable to motor vehicle owners living in suburban and country districts and is also useful to the automobile tourist who may readily attach the pump to the vehicle when close to a body of water and wash the vehicle, the power of the engine being transmitted to the pump and the pressure of the water delivered from the service pipe or hose 46 being regulated by increasing or diminishing the speed of the engine of the motor vehicle.

What is claimed is:—

1. A pump mechanism adapted to be driven by one of the driving wheels of a motor vehicle, said pumping mechanism comprising a stand embodying supporting means for the rear axle housing of a motor vehicle, a pump-supporting bed, supporting means forming a part of the stand for said pump-supporting bed, a pump mechanism mounted on said bed and embodying a pump-operating crank shaft, and a socket head adapted to be interposed between said crank shaft and the adjacent driving wheel of the motor vehicle.

2. A pump mechanism adapted to be driven by one of the driving wheels of a motor vehicle, said pumping mechanism comprising a stand embodying supporting means for the rear axle housing of a motor vehicle, a pump-supporting bed, supporting means forming a part of the stand for said pump-supporting bed, a pump mechanism mounted on said bed and embodying a pump-operating crank shaft, and a socket head adapted to be interposed between said crank shaft and the adjacent driving wheel of the motor vehicle, said socket head being detachable from said crank shaft and vehicle wheel.

3. A pump mechanism adapted to be driven by one of the driving wheels of a motor vehicle, said pumping mechanism comprising a stand embodying supporting means for the rear axle housing of a motor vehicle, a pump-supporting bed, supporting means forming a part of the stand for said pump-supporting bed, a pump mechanism mounted on said bed and embodying a pump-operating crank shaft, and a socket head adapted to be interposed between said crank shaft and the adjacent driving wheel of the motor vehicle, the supporting means for the driving axle housing and the supporting means for the pump bed being pivotally connected to the base of the stand so as to fold into substantially parallel relation thereto.

4. A pump mechanism adapted to be driven by one of the driving wheels of a motor vehicle, said pumping mechanism comprising a stand embodying supporting means for the rear axle housing of a motor vehicle, a pump-supporting bed, supporting means forming a part of the stand for said pump-supporting bed, a pump mechanism mounted on said bed and embodying a pump-operating crank shaft, and a socket head adapted to be interposed between said crank shaft and the adjacent driving wheel of the motor vehicle, the base of the stand comprising sections hinged together, the supporting means for the driving axle housing being hinged to said base, and the pump bed-supporting means being also hinged to said base.

5. A pump mechanism adapted to be driven by one of the driving wheels of a motor vehicle, said pumping mechanism comprising a stand embodying supporting means for the rear axle housing of a motor vehicle, a pump-supporting bed, supporting means forming a part of the stand for said pump-supporting bed, a pump mechanism mounted on said bed and embodying a pump-operating crank shaft, a socket head adapted to be interposed between said crank shaft and the adjacent driving wheel of the motor vehicle, the pump bed-supporting means being hinged to the base of the stand, and a longitudinally extensible brace connecting said pump bed-supporting means to the base and adapted to adjust the pump bed toward and away from the adjacent driving wheel of the vehicle.

In testimony whereof we affix our signatures.

CHESTER A. KEARNS.
PATRICK J. HARTIGAN.

Copies of this patent may be obtained for five cents each, by addressing the "Commissioner of Patents, Washington, D. C."